United States Patent

[11] 3,527,155

| [72] | Inventor | Donald G. Renn |
| | | 1147 Ripon St., Lewiston, Idaho 83501 |
| [21] | Appl. No. | 780,963 |
| [22] | Filed | Dec. 4, 1968 |
| [45] | Patented | Sept. 8, 1970 |

[54] SKEWER ASSEMBLY FOR ROTISSERIES
4 Claims, 4 Drawing Figs.

[52] U.S. Cl. ................................................. 99/421
[51] Int. Cl. ..................................................... A47j 37/04
[50] Field of Search ............................................. 99/421, 419, 420, 443; 126/25; 17/1(S)

[56] References Cited
UNITED STATES PATENTS

| 2,985,096 | 5/1961 | Wolske | 99/421(P)UX |
| 3,196,776 | 7/1965 | Norton | 99/421(P)UX |
| 3,205,812 | 9/1965 | Booth | 99/421(P)UX |

FOREIGN PATENTS

| 88,446 | 12/1966 | France | 99/421(P)UX |
| 1,265,159 | 5/1961 | France | 99/421(P)UX |

Primary Examiner—Walter A. Scheel
Assistant Examiner—Arthur O. Henderson
Attorney—Wells and St. John ABSTRACT: A skewer assembly apparatus for a conventional rotisserie unit is disclosed having circular plates that are mounted on a rotisserie rod and fixed thereto by a suitable clamping means. The circular plates have a plurality of equally spaced apertures formed therein near the periphery. The apertures facilitate mounting of a plurality of skewer rods which mount the various foods to be cooked. The skewer assembly is rotated by a motor which drives the rotisserie rod.

Patented Sept. 8, 1970
3,527,155
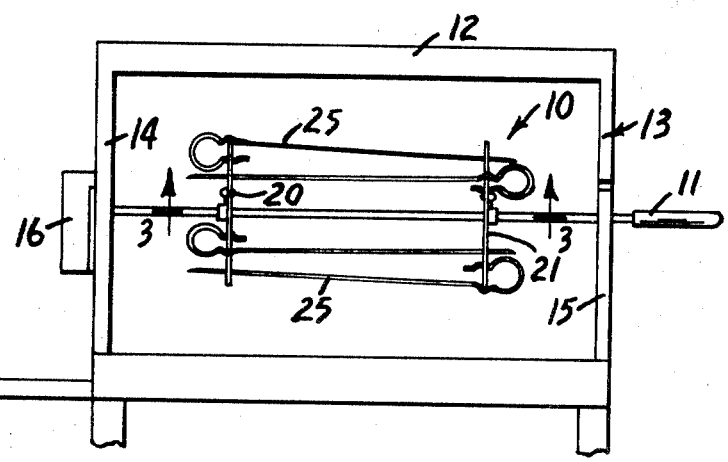
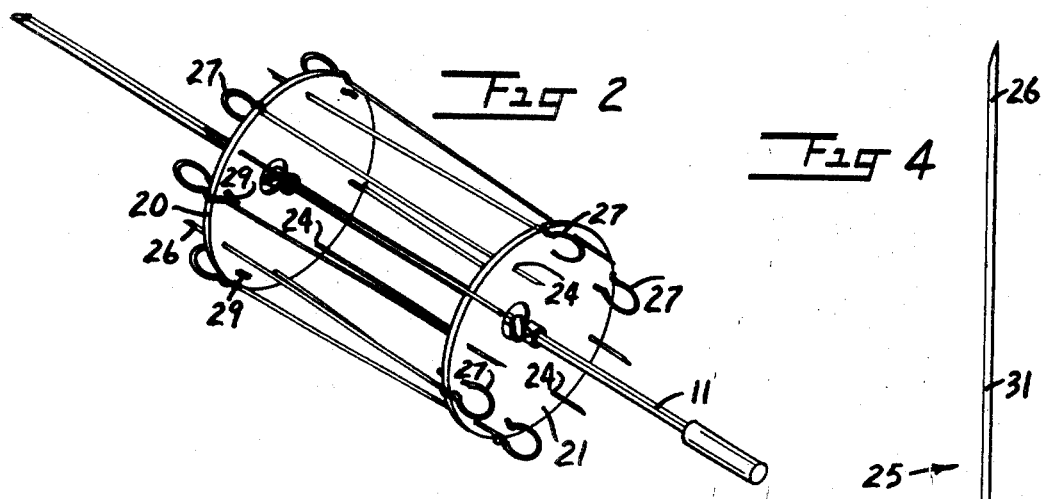
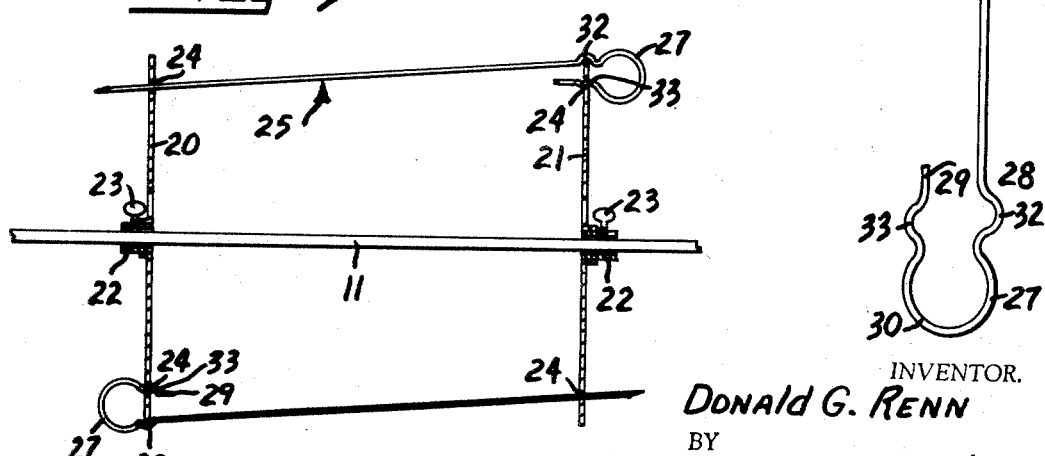
INVENTOR.
Donald G. Renn
BY
Wells & St. John
Attys.

3,527,155

1

SKEWER ASSEMBLY FOR ROTISSERIES

BACKGROUND OF THE INVENTION

This invention relates to rotisserie units and more particularly to skewer assemblies used therein to cook foods.

Generally skewer assemblies comprise some sort of holding means whereby foods may be secured in position for rotation over a heat source.

Although such skewer assemblies are available, they are often inefficient, expensive, hard to manufacture, or limit to a certain degree the amount of food which can be cooked at a single time. Furthermore, it is often difficult to clean these devices, which is an important consideration in the preparation of foods.

One of the principal objects of this invention is to provide a skewer assembly that is inexpensive, easy to manufacture, simple to use, and is easily cleaned and maintained. A further object of this invention is to provide a skewer assembly which is efficient in mounting the food for cooking.

An additional object of this invention is to provide a skewer assembly that has a wide range of capacities to facilitate cooking a small or a large portion of food at a single time.

BRIEF DESCRIPTION OF DRAWINGS

A preferred embodiment of this invention is illustrated in the drawings, in which:

FIG. 1 is a side view of a rotisserie unit having a rotisserie rod with a skewer assembly mounted on the rotisserie rod;

FIG. 2 is a perspective view of a skewer assembly as it is mounted on the rotisserie rod emphasizing the placement of skewer rods;

FIG. 3 is an enlarged sectional view taken along line 3—3 in FIG. 1; and

FIG. 4 is an enlarged view of a skewer rod.

DETAILED DESCRIPTION OF PREFERRED EMBODIMENT

My invention relates to a new and different skewer assembly 10 for a conventional rotisserie unit 13 employing such things as charcoal, gas, electric elements, or wood chips as heating elements for cooking meats and other foods. Rotisserie units of this type generally embody such elements as a hood 12, a rotisserie rod 11 and a rotisserie motor 16. The hood 12, in addition to the function of providing a shield from wind and dust, has sidewalls 14 and 15 for rotatably supporting rotisserie rod 11 horizontally at a prescribed length above the cooking means. A motor 16 is mounted on the side wall 14 to receive one end of the rotisserie rod to rotate the rotisserie rod 11 and the skewer assembly 10 about the longitudinal axis defined by the rotisserie rod 11 supported by the side walls.

The skewer assembly comprises two circular plates 20 and 21 that are mounted coaxially on the rod a predetermined spaced distance in opposing parallel relation. The plates 20 and 21 provide mounts for a plurality of skewer rods 25 therebetween. Each of the plates 20, 21 has a central aperture with a bushing 22 mounted therein to receive the rod 11. A thumb screw 23 is provided in each of the bushings 22 to threadably engage the rotisserie rod 11 to prevent movement of the skewer assembly 10 relative to the rotisserie rod 11. A plurality of equally spaced apertures 24 are formed through the plates 20, 21 near their periphery to receive the respective ends of the skewer rod 25. The apertures 24 are located an equal inward radial distance from the periphery of the plates 20, 21. The plates are angularly oriented on the rod 11 so that each aperture 24 is axially aligned with an aperture 24 of the other opposing plate.

Each skewer rod 25 has a piercing end 26, a straight shaft 31 and a looped mounting end 27. The piercing end 26 has a sharp point which may be inserted through meats and other goods to mount the food on the skewer rod 25. The looped mounting end 27 in addition to providing a means for securing the skewer rod 25 to the assembly, serves also as a handle which easily adapts to the hand to provide the needed grasping surface to enable one to insert the piercing end 26 through the food to be cooked in the rotisserie.

The looped mounting end 27 of each skewer rod 25 is formed by bending the skewer rod 25 back along itself to form two opposing substantially parallel sections 28 and 29—communicating with a curved section 30. The opposing sections 28 and 29 are spaced a distance less than the radial distance between the apertures 24 and the periphery of the plates 20, 21 requiring the displacement of the opposing sections 28 and 29 to position section 29 into an aperture 24 with section 28 engaging the periphery of a plate. The sections 28 and 29 have opposing outwardly curved or notched segments 32 and 33 respectively for receiving the plate to resiliently prevent the skewer rod from falling from the assembly as the rotisserie is rotated.

To utilize the skewer assembly 10 one first mounts each of the plates 20, 21 on the rod 11 by inserting the rod 11 through the bushings 22. The plates 20, 21 are moved along the rod 11 to a position which approximates the center portion of the rod 11 and are spaced along the rod 11 a distance somewhat less than the length of a skewer rod 25. The thumb screws 23 are then tightened thus securing the respective plates 20, 21 to the rod 11. Skewer rods 25 are taken in hand by the looped mounting end 27 and the piercing end 26 is inserted with a thrusting motion through the various morsels of food. The piercing end 26 is then inserted into an aperture 24 in either plate 20 or 21. The sections 28 and 29 are then slightly spread to insert section 29 into an aperture 24 of the opposing plate 20 or 21. The skewer rod 25 is then pushed axially until curved segments 32, 33 engage the periphery of the inserted aperture 24 and the adjacent edge of plates 20, 21. The spacing and direction of the skewer rods 25 may be varied as desired depending upon the size of the food and the amount of food to be cooked at one time.

Having secured the skewer rods 25 to the plates 20, 21 the rotisserie rod 11 is mounted between the side walls 14, 15 with one end extending into the rotisserie motor 16. Operation of the rotisserie motor 16 will rotate the rod 11, and the skewer assembly 10 so that foods may be evenly cooked.

I claim:

1. A rotisserie assembly to facilitate the cooking of meats and other foods on a conventional rotisserie unit having a horizontal rotisserie rod rotatably mounted therein, said assembly comprising:
   a. a pair of circular plates coaxially mounted on the rod spaced from each other, each of said circular plates having a plurality of apertures formed therethrough adjacent the periphery and equally spaced from the periphery of the plates; and
   b. a plurality of elongated skewer rods removably mounted between the circular plates about the rotisserie rod for supporting meats and other foods, each of said skewer rods having:
      1. a piercing end to facilitate the mounting of food on the skewer rod and to extend through one of the apertures of one of the plates; and
      2. a looped mounting end to extend over the periphery of the other plates and back through an aperture of said other plate, said looped mounting end having opposed notched segments for receiving the other plate therein to resist the removal of the skewer rod from the plate.

2. The rotisserie assembly as defined in claim 1 wherein each circular plate has a central aperture formed therethrough with a bushing mounted therein for receiving the rotisserie rod and wherein said bushing has a securing means thereon for locking the plate securely to the rod.

3. The rotisserie assembly as defined in claim 1 wherein the piercing end of each of said skewer rods is pointed to facilitate the mounting of food on the skewer rod.

4. The rotisserie assembly as defined in claim 1 wherein the distance between the said notched segments is less than the distance from the apertures to the periphery of the other circular plate, thus providing a spring biasing means to resist removal of the skewer rod from the plates.